D. NEUMAN.
GARDEN IMPLEMENT.
APPLICATION FILED JULY 27, 1918.
1,284,752.
Patented Nov. 12, 1918.
2 SHEETS—SHEET 1.
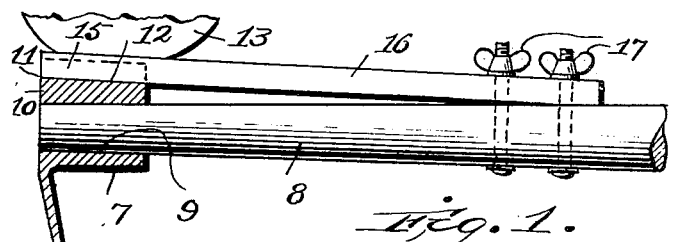
Fig. 5.
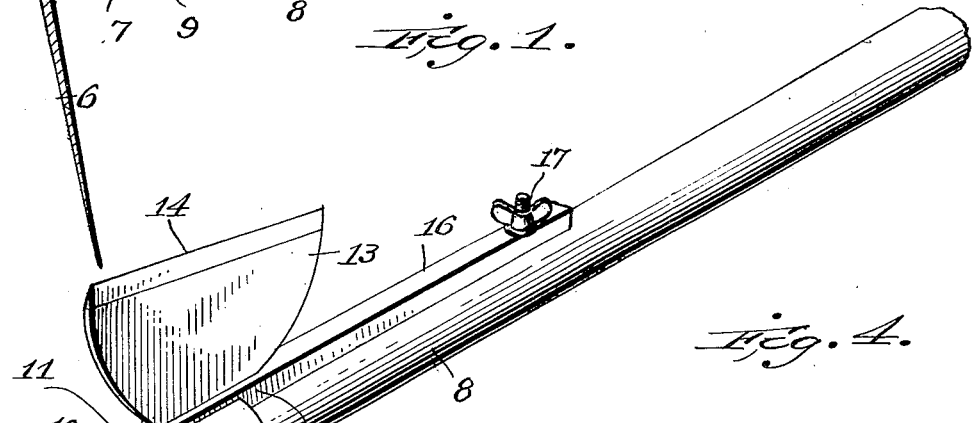
Fig. 1.
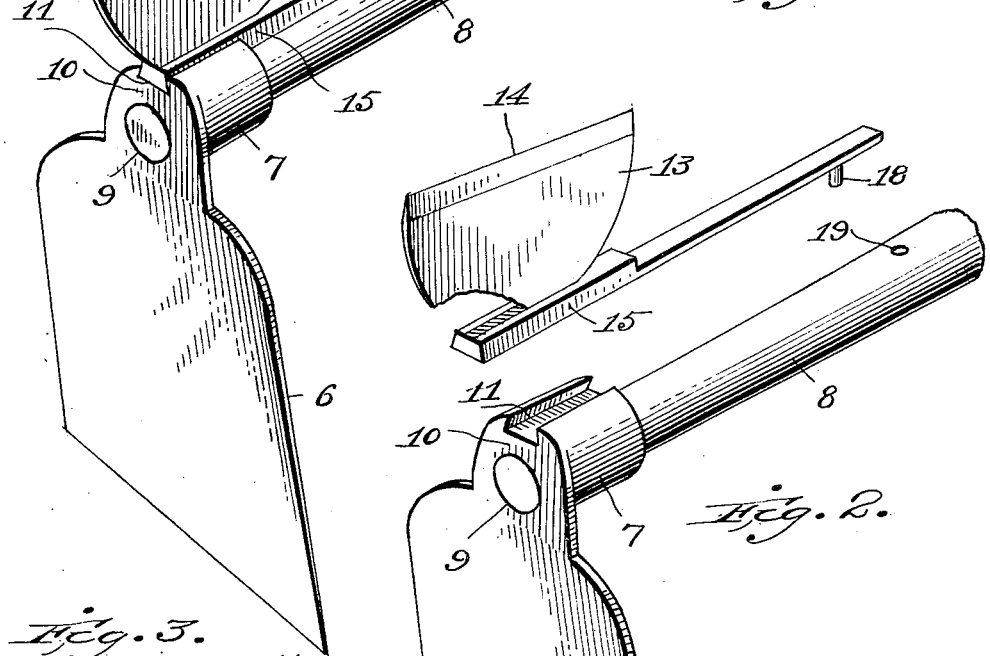
Fig. 4.
Fig. 2.
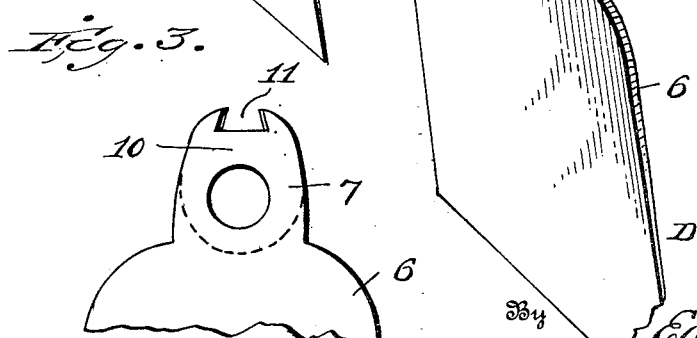
Fig. 3.
Inventor
David Neuman
By Edwin L. Jewell
his Attorney

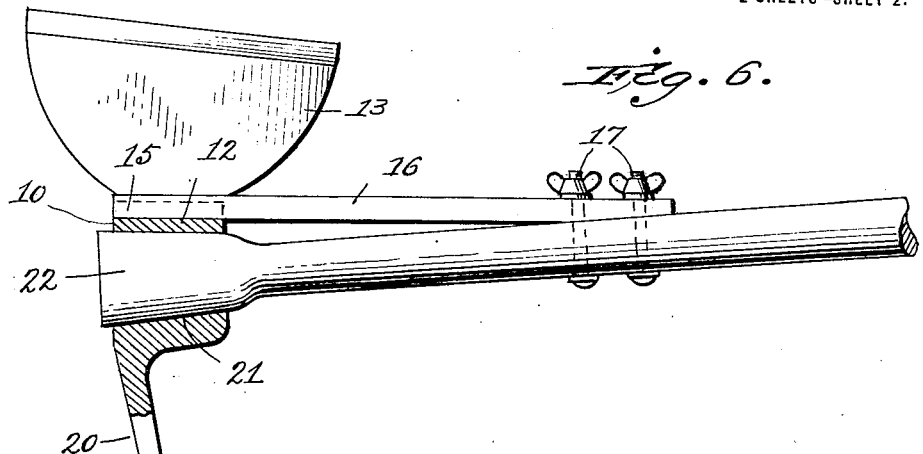
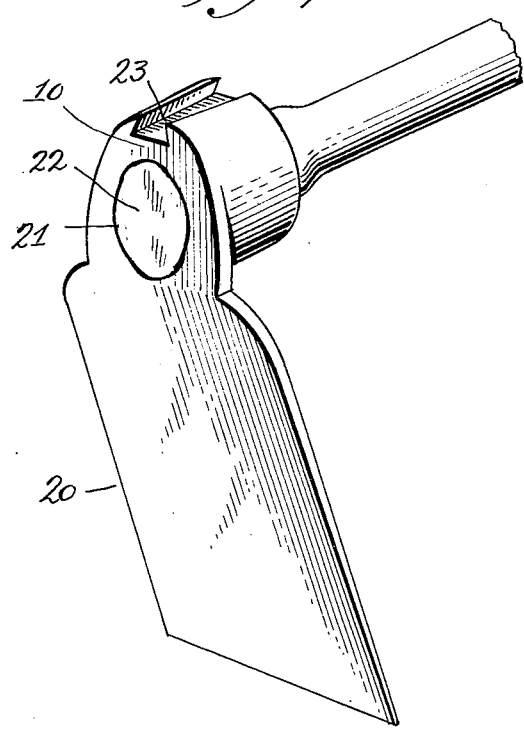

UNITED STATES PATENT OFFICE.

DAVID NEUMAN, OF ALBANY, GEORGIA.

GARDEN IMPLEMENT.

1,284,752.  Specification of Letters Patent.  Patented Nov. 12, 1918.

Application filed July 27, 1918. Serial No. 247,035.

*To all whom it may concern:*

Be it known that I, DAVID NEUMAN, citizen of the United States, residing at Albany, in the county of Dougherty and State of Georgia, have invented certain new and useful Improvements in Garden Implements, of which the following is a specification.

This invention relates to improvements in garden implements and has for its primary object, to provide a hoe having its handle receiving eye formed with a suitable means for removably receiving the back of cutter or edge-trimmer blade.

A further object is to provide a cutter or edge-trimmer blade which has a back adapted to be removably secured to a handle receiving eye of a suitable tool, and also formed with a means for securing to the handle of the tool, to prevent displacement of the cutter blade in the eye of the tool in which the cutter is seated and supported.

These and other objects hereinafter set forth, are attained by the means illustrated in the accompanying drawing, in which:—

Figure 1, is a perspective view of the combined hoe and cutter blade.

Fig. 2, is a detail perspective view of the hoe alone showing the means formed in its eye for removably receiving the back of the cutter blade.

Fig. 3, is a front view of a portion of the hoe.

Fig. 4, is a detail perspective view of a cutter blade showing a modified form of supporting back, and Fig. 5, is a longitudinal sectional view through the hoe, showing the handle and the cutter blade in side elevation.

Fig. 6, is a view similar to Fig. 5, showing the improved cutter-blade used in connection with a hoe having an eye with a rearwardly tapering handle receiving opening, and Fig. 7 is a perspective view of the hoe showing the cutter-blade holding groove tapered forwardly, or in an opposite direction from that shown in Fig. 2.

Similar reference numerals in all of the figures of the drawing designate like parts.

Referring to the drawing, the hoe is shown to consist of the usual blade 6, a handle receiving eye 7, and a handle 8 which is preferably tapered and adapted to be forced into a tapered opening 9 formed through the eye 7. The opening 9 is formed eccentric through the eye 7, to obtain on the upper side of the openings a relatively thick section of metal, as shown at 10, in which can be formed a deep seat for the reception of the back of the removable tool. The deep seat is a dove-tail groove 11 extending longitudinally of the eye 7, and is preferably tapered from the front to the rear, as shown clearly in Fig. 2 of the drawing, and is also preferably inclined downwardly toward its rear end and relative to the axis of the handle, as shown at 12 in Fig. 5 of the drawing.

The cutter blade or edge trimmer consists of a flat blade 13, preferably formed with a long cutting edge 14, and a thickened back edge 15 to provide a firm support for the blade. The thick back edge is coextensive in length, width, or longer than the groove 11, and is also dove-tailed and tapered similar to the groove 11, so that it will fit tightly therein. Preferably the thick back of the cutter blade is extended rearwardly a considerable distance, as shown at 16, so that when the cutter blade is properly supported in place in the groove 11, the extended end of the back can be secured to an intermediate portion of the handle. In Fig. 1 of the drawing the securing means is a screw bolt 17 which passes through the end of the back and into the handle. In Fig. 5 is shown two securing bolts 17, and in the modified form of back shown in Fig. 4, the extended portion of the back is made relatively thin, to make it slightly resilient, and the end of the thin portion is provided with a depending pin 18 which, through the resiliency of the thin portion of the back, will snap into a hole 19 formed in the handle.

Groove 11 being tapered rearwardly, and the back of the cutter blade being tapered likewise, it is obvious that the taper upon the parts will limit the backward movement of the blade, and thereby position the holes in the handle and back to receive the bolts 17. Furthermore, the tapered parts will take up the strains and relieve the strains upon the securing bolts, when the forward end of the cutter blade is forced into the ground. The dove-tailed connection between the blade and eye, prevents the blade from dropping out of the groove, or from being pulled out by entanglement with roots or other obstructions, and in inclining the groove downwardly to the rear, as at 12, inclines the back of the cutter blade also downwardly and in a direction to engage the handle at a distance from the eye, thereby preventing the springing of the back to secure it to the handle.

The combined hoe and edge trimmer shown, with the blades arranged at right-angles to each other, forms an ideal garden implement, in that the hoe can be used in the ordinary manner, and without user changing his position, the cutter blade can be brought into use by simply reversing the implement. When it is desired to use the hoe alone, the cutter blade can be readily removed, and with the Fig. 4 construction, without the use of a screw-driver or other tool. In making the thick section above the handle opening forms a strong seat for the cutter, and at the same time does not weaken the eye of the hoe.

After the back of the cutter is positioned in the tapered groove of the eye, and the extended end of the back is secured to the handle, it is impossible to pull the tapered end of the handle from the eye, and the attachment of the cutter to the handle, prevents any outward movement of the cutter. In other words, the handle and the cutter coöperate to retain each other in position.

The tool or implement thus constructed provides a simple, strong and durable device, also inexpensive to manufacture.

In Figs. 6 and 7 the usual field or grub-hoe 20 is shown, the eye of the same having a handle opening 21 which tapers rearwardly, and is substantially larger in diameter than is the cross section of the main portion of the handle, so that said handle can be inserted from the front side of the hoe. The tool end of the handle is enlarged, as shown at 22, and the enlargement is also tapered rearwardly correspondently to the opening 21, thus when the handle is properly in place, and the hoe is in use, it is impossible to dislocate the tool in a forward direction.

With the handle and its opening thus tapered rearwardly, the seat for the supplemental tool in the top side of the eye, can either be tapered forwardly, as shown at 23 in Fig. 7, or rearwardly as shown in Fig. 2. When it is tapered forwardly or opposite to the taper of the handle opening, the supplemental tool and the handle coöperate to retain each other in place through the opposed tapers, and the back of the supplemental tool is inserted in its seat, in an opposite direction to that in which the handle is inserted.

Having thus fully described the invention, what is claimed is:—

1. A garden implement, comprising a hoe or like tool having an eye formed with a handle opening extending longitudinally therethrough, and also provided with a dove-tail groove on its upper side and parallel with said handle opening, a handle having one end fitted in said opening, and another tool having a dove-tail back edge adapted to be removably positioned in said dove-tail groove and provided with means adapted to be secured to said handle.

2. A garden implement, comprising a hoe or like tool having an eye formed with a tapered handle opening extending longitudinally therethrough, and also provided with a tapered dove-tail groove on its upper side and parallel with said handle opening, said opening and groove being tapered in opposite directions, a handle having one end fitted in said opening, and another tool having a tapered dove-tail back edge adapted to be removably positioned in said groove and provided with means adapted to be secured to said handle.

3. A garden implement, comprising a hoe or like tool having an eye formed with a tapered handle opening extending longitudinally therethrough, said handle opening being eccentric in said eye to form a thick section above said opening, said eye being also provided with a tapered dove-tail groove located in said thick section and parallel with said handle opening, said opening and groove being tapered in opposite directions, a handle having one end fitted in said opening, and another tool having a tapered dove-tail back edge to fit said groove and provided with means adapted to be secured to said handle.

4. A garden implement, comprising a hoe or like tool having an eye formed with a tapered handle opening extending longitudinally therethrough, said handle opening being eccentric in said eye to form a thick section above said opening, said eye being also provided with a tapered dove-tail groove located in said thick section and parallel with said handle opening, said opening and groove being tapered in opposite directions, a handle having one end fitted in said opening, and another tool having a tapered dove-tail back edge to fit said groove, said back edge having an extended end adapted to be secured to said handle.

In testimony whereof I affix my signature.

DAVID NEUMAN.